Feb. 3, 1959     H. R. GREENLEE     2,871,904
SAFETY PNEUMATIC TIRE
Filed Dec. 5, 1956
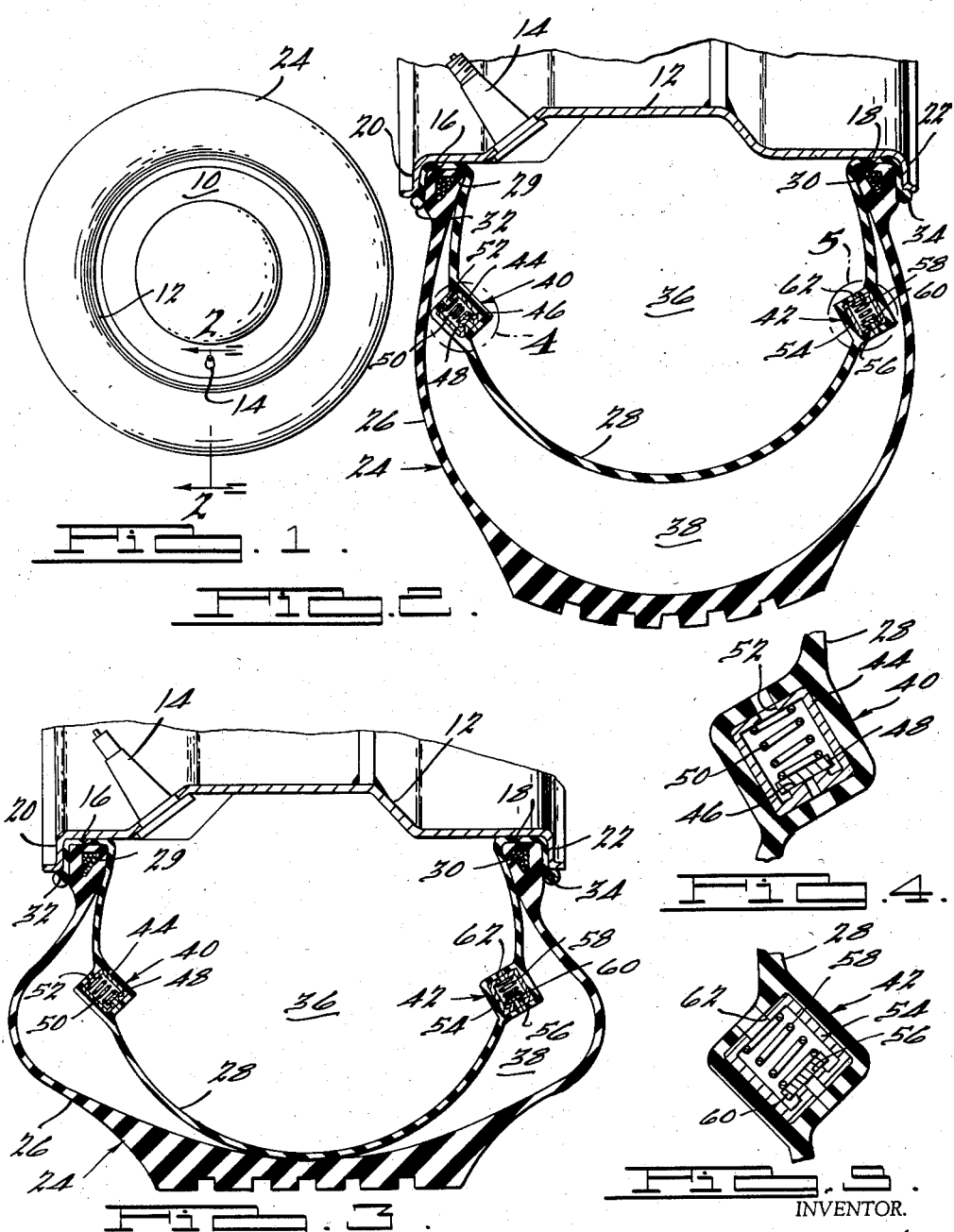
INVENTOR.
Harry R. Greenlee.
BY
Harness and Harris
ATTORNEYS.

United States Patent Office 2,871,904
Patented Feb. 3, 1959

2,871,904
SAFETY PNEUMATIC TIRE

Harry R. Greenlee, Detroit, Mich., assignor to Chrysler Corporation, Highland Park, Mich., a corporation of Delaware Application December 5, 1956, Serial No. 626,501

1 Claim. (Cl. 152—341)

This invention relates to a pneumatic tire of the tubeless type haivng an inner air chamber capable of keeping the tire distended after a rupture of the outer casing and collapse of an outer air chamber and more particularly to a combination of valves in such a tire adapted to accommodate inflation of the inner and outer air chambers through a single two-way inflation valve.

Heretofore, safety tires of the tubeless type having inner and outer air receiving chambers have been built and inflation of the inner chamber has been accomplished by means of a conventional two-way inflation valve carried by the wheel rim, but inflation of the outer chamber has presented complications. One means of inflating the outer air chamber which has been used is to provide a supplemental fitting usually formed of rubber in the sidewall of the outer casing of the tire and to inflate the outer air receiving chamber by inserting a needle valve in this supplemental fitting. This is an unsatisfactory solution to the problem for it requires that every car and service station be provided with a needle valve and there is some reason to believe that repeated use of the needle valve will cause the supplemental fitting to develop an air leak.

Another means of inflating the outer air chamber which has been tried has been to provide a valve in the partition separating the inner and outer chambers with this valve adapted to let air out of the inner chamber very slowly if rupture of the outer casing occurs. A tire of this type is illustrated in M. B. Riggs U. S. Patent No. 2,756,800. This type of tire requires a very slow filling of the tire and provides only temporary relief in the event of a blowout for a slow leak is built in to the partition separating the air chambers. In addition, a problem is presented as to how to deflate the outer chamber when it has been overinflated or when it is desired to remove the tire from its rim.

One object of my invention is to provide a pair of valves in a partition separating inner and outer air chambers with a first one of these valves operable to accommodate the discharge of air from the inner chamber to the outer chamber whenever the air pressure in the inner chamber exceeds the pressure in the outer chamber by a predetermined amount and with the other of these valves operable to accommodate discharge of air from the outer chamber to the inner chamber when the air pressure in the inner chamber is less than the air pressure in the outer chamber. The inner chamber is inflated through a conventional two-way inflation valve and the outer chamber receives air therefrom through the above mentioned first valve. If desired, air may be withdrawn from the inner chamber through the conventional inflation valve and when the pressure in the inner chamber becomes less than the air pressure in the outer chamber further deflation through the inflation valve will reduce the air pressure in each chamber by reason of the above mentioned other valve.

Another object of my invention is to provide a tire having inner and outer air chambers and valve means to accommodate inflation of both air chambers by the use of tire pump fittings and gauges which are presently in common use.

It is also an object of my invention to provide a novel valve mechanism which permits the use of a single valve stem for inflating a plurality of air receiving chambers in a tire and which distributes the air admitted therethrough between the several air receiving chambers so that each will have a desired preselected air pressure.

In the drawings:

Fig. 1 is an elevational view of a wheel and tire assembly;

Fig. 2 is an enlarged partial sectional view taken on the line 2—2 of Fig. 1 and showing the tire inflated;

Fig. 3 is a view similar to Fig. 2 but showing the outer air receiving chamber of the tire deflated;

Fig. 4 is a fregmentary sectional view on an enlarged scale of the valve designated by the broken line 4 in Fig. 2; and Fig. 5 is a fragmentary sectional view on an enlarged scale of the valve designated by the broken line 5—5 in Fig. 2.

A wheel 10 having a rim portion 12 is provided with a conventional inflation valve 14. The inflation valve 14 is mounted in a conventional manner in an opening in the rim 12 so that an airtight seal is maintained. The valve 14 will be designated herein as an inflation valve although it is to be understood that it is of conventional construction and that it can be used for inflating and deflating a tire.

The rim 12 is provided with annular seats 16 and 18 which are adapted to receive the beaded portion of a tire. In addition, the rim 12 is provided with annular flanges 20 and 21 which prevent the tire beads from moving axially outward.

A tire generally designated by the numeral 24 includes an outer casing 26 and an inner partition or diaphragm 28. The tire casing 26 is of open bellied construction and has a pair of annular beaded edges 29 and 30 which are respectively adapted for mounting on the annular seats 16 and 18. The tire casing 26 cooperates with the rim 12 to define an annular chamber and the partition 28 is formed of a substantially inextensible material. One material which has been found to operate satisfactorily is nylon. The partition 28 includes an outwardly bowed annular portion for spanning the space between the beaded edges 29 and 30 of the tire casing throughout the peripheral extent of the beaded edges. The partition 28 is provided with extensions 32 and 34 which are integral with the partition and retain the partition in place by extending between the beaded edges 29 and 30 of the tire casing and the annular seats 16 and 18 of the rim. A suitable mounting of the partition and the tire casing on the rim is more completely described in M. B. Riggs Patent No. 2,756,800 and reference may be made thereto for a more complete description of the mounting of the tire components on the rim.

The diaphragm 28 has a smaller outer diameter than the inner wall of the tire casing 26 in which it is to be mounted and it has an outer diameter which is larger than the rim diameter so that it subdivides the annular chamber defined by the tire casing and rim into an inner air receiving chamber 36 and an outer air receiving chamber 38.

The valve mechanism to be described herein is incorporated in the partition 28 in the form of two cartridge valves 40 and 42 which are embedded in the partition 28. The valve 40 is a pressure valve including an outer casing 44 having a valve seat 46 and a valve member 48 which is retained upon the seat 46 by a spring 50. An aperture 52 is provided in the valve casing 44 to complete a passage through the valve from the inner air receiving chamber 36 to the outer air receiving chamber 38 when the valve is open. The spring 50 is preselected in strength so that the valve member 48 will be lifted off of the seat 46 whenever the air pressure in the inner chamber 36 exceeds the air pressure in the outer chamber 38 by a predetermined amount. I have found, for example, that a satisfactory tire is obtained when the spring 50 is adapted to accommodate opening of valve 40 when the pressure in chamber 36 exceeds the pressure in chamber 38 by 25 pounds per square inch. The valve 42 is a check valve including a casing 54 having a valve seat 56 and a light spring 58 which retains a valve member 60 on seat 56. An aperture 62 is provided in casing 54 to cause the fluid flow communication between chamber 38 and 36 when valve member 60 is raised from the valve seat 56. It is intended that valve 42 operate as a check valve which will prohibit the passage of air therethrough from inner air chamber 36 to outer air chamber 38, but which will readily accommodate the escape of air from the outer chamber 38 to the inner chamber 36 whenever the pressure in the inner chamber 36 is less than the pressure in the outer chamber 38.

The valves 40 and 42 have been illustrated as symmetrically placed relative to the tire and it is to be understood that they could be placed 180° apart around the periphery of the rim to improve wheel balance if desired. As illustrated in the drawing the valves 40 and 42 are adapted to utilize the centrifugal force encountered as an incident to rotation of the tire during normal usage to urge the valve members 48 and 60 of these valves on to the respective valve seats 46 and 56 to assure closure of the valves. This is accomplished by locating the valve seats radially outwardly relative to their associated valve members.

In the operation of the device it will be seen that air may be applied through inflation valve 14 in the conventional manner. This air will inflate the inner chamber 36 for air cannot escape through valve 40 until a predetermined pressure differential exists between the inner chamber 36 and the outer chamber 38 while the valve 42 is a check valve which under no conditions accommodates the escape of air from inner chamber 36 to outer chamber 38. When the pressure in the inner chamber 36 exceeds the predetermined pressure at which valve 40 is set to open air will escape through valve 40 to the outer chamber 38. By way of example and in order to simplify the explanation let it be assumed that the valve 40 is set to permit the escape of air from inner chamber 36 to outer chamber 38 when a pressure differential of 25 pounds per square inch exists between these chambers. Air may be added through inflation valve 14 until the air pressure in the inner chamber 36 increases, for example, to a pressure in the neighborhood of 55 pounds per square inch. There would then be an air pressure of 30 pounds per square inch in the outer casing 38 and both the inner and outer chambers would be inflated. If desired, the tire may be operated in this condition in which the inner chamber is under greater pressure than the outer chamber. However, if a softer inner chamber is preferred than air may be permitted to escape through the two-way inflation 14 in the conventional manner and at first air will escape only from the inner chamber 36. However, if the deflation is continued through valve 14 until the pressure in inner chamber 36 begins to fall below the 30 pounds per square inch pressure then existing in the outer chamber 38 air will escape from outer chamber 38 through valve 42. Thus, for example, when the pressure in the inner chamber 36 has reached 29 pounds per square inch there will be a pressure differential across valve 42 and it will be open and permit air to escape from the outer chamber 38 to the inner chamber 36. The pressure in the two chambers is thus balanced and deflation may be continued until the tire pressure drops to a desired level, such as, for example, 23 pounds per square inch. A conventional tire gauge may be used at the inflation valve 14 to determine when the air pressure has reached a desired level.

In the event that the outer tire casing is damaged and loses its air due to a cut, puncture or blow out the outer casing 38 will deflate, but air pressure will be maintained in the inner chamber for a considerable period of time. If the air pressure in the inner chamber 36 is greater than the above mentioned predetermined pressure defined by valve 40 then valve 40 will permit air to escape from the inner chamber until the predetermined pressure is attained. Thereafter, valve 40 will close and the air then existing in the inner chamber 36 will be retained. In the event of a slow leak in the outer chamber 38 this air from the inner chamber 36 will temporariily assist in replenishing the air escaping from the outer chamber. If the air pressure in the inner chamber 36 was lower than the above mentioned predetermined pressure at the time of the rupture of casing 26 then the air then in the inner chamber 36 will be retained therein and will not escape through the valve 40. Thus, in the above example where it was shown that a pressure of 23 pounds per square inch exists in the inner chamber 36 while the valve 40 will not open unless at least a 25 pound per square inch pressure differential exists between the two chambers when the outer air chamber 38 collapses as illustrated in Fig. 3 the inner chamber 36 will retain air under a pressure of approximately 23 pounds per square inch and may be used to support the wheel until a service station is reached.

What is claimed is:

A pneumatic tire adapted for mounting upon the rim of a wheel having an inflation valve, said tire comprising an outer annular casing adapted to cooperate with the wheel rim to define an annular chamber, said tire further including means forming a partition subdividing said chamber into inner and outer annular air receiving compartments, first and second valves providing restricted communication between said compartments, said inflation valve extending through said rim and into communication with said inner compartment to accommodate the admission of air into said inner compartment, said first valve comprising a one-way pressure valve adapted to accommodate the escape of air from said inner compartment to said outer compartment whenever the pressure in said inner compartment exceeds the pressure in said outer compartment by a predetermined amount, said second valve comprising a check valve adapted to accommodate the escape of air from said outer compartment to said inner compartment whenever the air pressure in said outer compartment exceeds the air pressure in said inner compartment whereby inflation of both compartments of the tire may be accomplished by inserting air under pressure through said inflation valve and inflating said inner compartment so that sufficient air escapes through said first valve to inflate said outer compartment to a desired pressure and deflation of said inner compartment through said inflation valve will also effect a deflation of said outer compartment when the pressure in said inner compartment is less than the pressure in said outer compartment, each of said first and second valves having an inlet and an outlet with the inlet thereof located relative to said tire radially outwardly of the associated outlet, each of said first and second valves further being provided with means defining a valve seat, a closure element mounted for movement in a direction toward the related valve inlet for engagement with said seat to effect valve closure and spring means urging said closure element toward its associated valve seat, said first valve having its inlet in constant fluid flow communication with said inner compartment and said second valve having its inlet in constant fluid flow communication with said outer compartment.

References Cited in the file of this patent

UNITED STATES PATENTS

| | | |
|---|---|---|
| 1,858,094 | Iruz | May 10, 1932 |
| 2,554,815 | Church | May 29, 1951 |
| 2,756,800 | Riggs | July 31, 1956 |